United States Patent [19]

Noda et al.

[11] Patent Number: 4,638,352
[45] Date of Patent: Jan. 20, 1987

[54] COLOR VIDEO CAMERA SIGNAL PROCESSING CIRCUIT

[75] Inventors: Masaru Noda, Fujisawa; Toshihiro Shiga, Yokohama, both of Japan

[73] Assignee: Hitachi, Ltd., Tokyo, Japan

[21] Appl. No.: 650,523

[22] Filed: Sep. 14, 1984

[30] Foreign Application Priority Data

Sep. 16, 1983 [JP] Japan ................... 58-169184
Oct. 13, 1983 [JP] Japan ................... 58-189877

[51] Int. Cl.⁴ .......................... H04N 7/04; H04N 9/64
[52] U.S. Cl. ...................................... 358/44; 358/41; 358/29; 358/51; 358/43
[58] Field of Search ................. 358/41, 43, 44, 48, 358/29, 29 C, 30, 51

[56] References Cited

U.S. PATENT DOCUMENTS

| 4,166,280 | 8/1979 | Poole | 358/51 |
| 4,395,730 | 7/1983 | Shen | 358/29 C |
| 4,437,111 | 3/1984 | Inai et al. | 358/44 |
| 4,480,266 | 10/1984 | Hashimoto | 358/43 |
| 4,504,854 | 3/1985 | Masuda | 358/44 |
| 4,506,290 | 3/1985 | Hashimoto | 358/29 C |

OTHER PUBLICATIONS

All Solid State Color Camera with Single-Chip MOS Imager; Nabeyama et al; IEEE Trans. on Consumer Electronics; vol. 1, CE-27; Feb. 1981.
PAL System Solid State Color Camera with Single Chip MOS Imager; Masuda et al; IEEE International Conference on Consumer Eletronics; Digest of Technical Paper, pp. 154–155; Jun. 9, 1983.

Primary Examiner—Michael A. Masinick
Assistant Examiner—John K. Peng
Attorney, Agent, or Firm—Antonelli, Terry & Wands

[57] ABSTRACT

A color video camera processing circuit is provided with a circuit for generating an intensity signal containing color signals from photo-sensors at predetermined proportions, and a circuit for generating color difference signals on the basis of the color signals independently from the intensity signal. A color video signal is generated on the basis of the intensity signal and the color difference signals. A color reproducibility and Moiré or the color reproducibility and an S/N ratio are improved. The Moiré is significantly suppressed by rendering products of ratios of sensitivities of the photo-sensors and component ratios of the color signals to be summed to be substantially equal.

21 Claims, 14 Drawing Figures

| $W_{11}$ | $Ye_{12}$ | $Cy_{13}$ | $W_{14}$ | $Ye_{15}$ | $Cy_{16}$ |
|---|---|---|---|---|---|
| $W_{21}$ | $Ye_{22}$ | $Cy_{23}$ | $W_{24}$ | $Ye_{25}$ | $Cy_{26}$ |
| $W_{31}$ | $Ye_{32}$ | $Cy_{33}$ | $W_{34}$ | $Ye_{35}$ | $Cy_{36}$ |

COLOR VIDEO CAMERA SIGNAL PROCESSING CIRCUIT

The present invention relates to a color video camera signal processing circuit, and more particularly to signal processing for allowing high color reproducibility, high S/N ratio and good a Moiré characteristic.

Generally, a color television signal is obtained such that primary color signals for red, green and blue color components of a subject are generated and these primary color signals are then subjected to the γ-correction, white clipping and black clipping, and further subjected to the color encoding. Accordingly, in a prior art color video camera, three image pickup tubes are required to generate such three primary color signals.

In recent years, the spread of a home video tape recorder (VTR) has been more and more increasing and a need for a color video camera for use with the home VTR has been also increasing. Such a color video camera requires a high resolution and a sharpness of an image as well as a compactness in size and a low price. Accordingly, a single tube type or single chip type camera which uses only one image pickup tube or solid-state imager is primarily used.

In such a single tube type or single chip type color video camera, a color decomposing optical filter having fine areas for transmitting different colors arranged in a predetermined order is provided on a photo-sensing plane of the image pickup tube or the solid state imager (hereinafter collectively referred to as an imager), to color-decompose a light from a subject and direct the decomposed lights to the photo-sensing plane of the imager. The color decomposing optical filter often uses a so-called complementary color system in which yellow, cyan and transparent lights having high degrees of light transparency are transmitted instead of primary color lights (i.e. red, green and blue primary color lights) having low degrees of light transparency.

FIG. 1 schematically shows an example of a photo-sensing plane of a solid-state imager having such a color decomposing optical filter. W denotes a white light photo-sensor (which senses a transparent light), Ye denotes a yellow light photo-sensor and Cy denotes a cyan light photo-sensor. Photo-sensors are arranged on the photo-sensing plane, one for each of fine areas of the color decomposing filter, with suffixes to W, Ye and Cy representing positions thereof.

Signals of the photo-sensors are read out from left to right for each line, that is, in an order of $W_{11}$, $Ye_{12}$, $Cy_{13}$, $W_{14}$, ..., $W_{21}$, $Ye_{22}$, $Cy_{23}$, $W_{24}$, ... The signals are read out by a switching circuit provided one for each photo-sensor and horizontal and vertical scan circuits which actuate the switching circuits in the above order.

The signals read from the photo-sensors are divided into groups of same types of photo-sensors so that the signal read from the W photo-sensors (hereinafter referred to as a signal W), the signal read from the Ye photo-sensors (hereinafter referred to as a signal Ye) and the signal read from the Cy photo-sensors (hereinafter referred to as a signal Cy) are outputted from separate signal lines as shown in FIG. 2. R (red), G(green) and B (blue) components of the signals W (transparent), Ye (yellow) and Cy (cyan) are given by the following formulas.

$$W = R + G + B \quad (1)$$

$$Ye = R + G \quad (2)$$

$$Cy = G + B \quad (3)$$

Those signals W, Ye and Cy are amplified and processed to produce an intensity signal (hereinafter referred to as a signal Y), a red signal (hereinafter referred to as a signal R) and a blue signal (hereinafter referred to as a signal B).

$$Y = W + Ye + Cy \quad (4)$$

$$R = W - Cy \quad (5)$$

$$B = W - Ye \quad (6)$$

In a prior art camera which uses the complementary color system imager, those signals Y, R and B are processed in a color processing stage to produce a camera signal output in order to assure a high S/N ratio of the intensity signal Y and a high resolution.

FIG. 2 shows a configuration of such a camera. Numeral 1 denotes an imager which produces signals W, Ye and Cy. Numeral 20 denotes a pre-amplifier, numeral 30 denotes an R-signal matrix, numeral 31 denotes a B-signal matrix, numeral 40 denotes an intensity signal matrix, numeral 50 denotes a processing circuit, numeral 6 denotes a color encoder and numeral 7 denotes an output terminal.

A signal flow is first explained briefly. The output signals W, Ye and Cy from the imager 1 are amplified by the pre-amplifier 20 and the signal R is generated by the R-signal matrix 30, the signal B is generated by the B-signal matrix 31 and the signal Y is generated by the Y-signal matrix 40. The signals R, B and Y are processed for a γ-correction by the processing circuit 50, which produces a processed signal Y', and processed color difference signals (Y'−R') and (Y'−B'). Then, an NTSC standard signal is generated in the color encoder 6 from the signals Y', (Y'−R') and (Y'−B') to produce a camera signal output.

Two problems encountered in the prior art circuit are now discussed. The formula (4) for the generation of the signal Y in the Y-signal matrix 40 is a simplified formula to represent a concept and it is exactly represented as $$Y = y_1 W + y_2 Cy + y_3 Ye \quad (4')$$

where $y_1$, $y_2$ and $y_3$ are positive numbers representing component ratios. Similarly, R and B are exactly represented as $r_1 W - r_2 CY$ and $b_1 W - b_2 Ye$, respectively, where $r_1$ and $r_2$ are positive numbers representing color component ratios of the signal R and $b_1$ and $b_2$ are positive numbers representing color component ratios of the signal B. The components of the signal Y are varied by adjusting $y_1$, $y_2$ and $y_3$. The S/N ratio, color reproducibility and Moiré factor change with those components. The Moiré is a folding or a false signal generated in sampling on the photo-sensing plane of the imager due to different ratios of sensitivities of the photo-sensors W, Cy and Ye. It causes a white glare in fine areas of an image pattern. The ratios of the sensitivities of the photo-sensors W, Cy and Ye are defined by ratios of levels of signals which the photosensors produce when they receive a white light.

When a high S/N ratio is desired, it is desirable to increase the factor of the signal W which is derived by photo-electrically converting the light transmitted through the transparent filter and which has a highest S/N ratio, that is, to increase $y_1$.

On the other hand, when a high color reproducibility is desired, it is desirable to select the component of Y to $$Y = 0.30R + 0.59G + 0.11B$$

which meets the NTSC standard.

When a high Moiré characteristic is desired, it is desirable that the ratios of the components W, Cy and Ye of the signal Y in the formula (4') are selected to be reciprocals of the ratios of the sensitivities of the photo-sensors (that is, products of corresponding terms of the formula representing the ratios of the components of the signal Y and the formula representing the ratios of the sensitivities of the photo-sensors are equal) so that differences of the sensitivities to the respective color signals are cancelled. However, in the prior art circuit, since the signal Y relating to the intensity reproduction is also used as the signal Y for generating the color difference signal relating to the color reproduction, or vice versa, the S/N ratio or the Moiré characteristic is deteriorated when the color reproducibility is emphasized, and the color reproducibility is deteriorated when the S/N ratio or the Moiré characteristic is emphasized. A first problem in the prior art circuit is a discrepancy among those requirements.

A second problem in the prior art circuit is a color error due to the use of the signals R, B and Y in generating the color difference signal. The color error is discussed in detail in the article "PAL System Color Camera with Single Chip MOS Imager" by M. Noda et al., Journal of Television Association of Japan, 36, 11, pages 1003–1009 (November 1982) or IEEE Trans. on Consumer Electronics, Vol. 1 CE-27, February 1981. There are two causes for the color error. A first cause is a γ-correction circuit in the processing circuit 50. In order to attain a correct color reproduction, the same γ-correction should be made for the signals R, G and B. In the prior art circuit, however, an error is included in the G-signal component of the camera output because the γ-correction for the signal G is made by the γ-correction for the G-signal component included in the signal Y. A second cause is a white balance adjustment in the processing circuit 50. The white balance is adjusted by varying gains of amplifiers in the processing circuit for the signals R and B in accordance with a change of a color temperature. The color error in thus included in the camera output because the components R, G and B in the signal Y are constant.

As discussed above, in the prior art signal processing circuit, the signals Y, R and B are generated from the imager output signals W, Ye and Cy and they are processed to produce the NTSC standard output. This method of producing the NTSC standard output from the signals Y, R and B is an obstacle to the improvement of the three factors, the color reproducibility of the camera, the S/N ratio and the Moiré characteristic.

The Moiré phenomenon is explained in further detail.

The signal Y is nothing but a signal sequence derived by sequentially sampling the optical image focused on the photo-sensing plane of the solid-state imager shown in FIG. 1, on the photo-sensing planes $W_{11}$, $Ye_{12}$, $Cy_{13}$, $W_{14}$, $Ye_{15}$, ... The sampling frequency fs is determined by the number of pixels (i.e. the number of photo-sensors) and a horizontal scan period, and it is, for example, 14.4 MHz under the present state of art.

As described above, the sensitivities (signal levels produced when a white light is applied) of the photo-sensors W, Ye and Cy are not equal but that of the photo-sensor W is highest while that of the photo-sensor Cy is lowest. As a result, the intensity signal is derived by sequentially reading out a sequence of sets of photo-sensors W, Ye and Cy and has a basic sampling frequency equal to fs/3 or 4.8 MHz.

Thus, the intensity signal formed by the output signal from the solid-state imager having the color decomposing optical filter has two basic sampling frequencies of 14.4 MHz and 4.8 MHz. When a subject having a fine pattern is imaged by such a solid-state imager, beats are generated in spatial frequency regions around the spatial frequencies 14.4 MHz and 4.8 MHz corresponding to the basic sampling frequencies. Since the beat in the 14.4 MHz region has a low response because of a low lens optical transfer function (OTF), it does not substantially deteriorate the image quality but the beat in the 4.8 MHz region causes a substantial deterioration of the image quality. Such a beat disturbance due to the sampling is usually called the Moiré. In the present case, the intensity of the Moiré is approximately 0.15 to the signal at a color temperature of 3200° K. When an outdoor scenery containing many fine patterns is imaged, a glare is observed. It is the Moiré, which significantly deteriorates the image quality. As described above, the Moiré is caused by the difference between the sensitivities of the photo-sensors W, Ye and Cy. As the color temperature varies, the sensitivities change and the degree of the Moiré also changes. Further, under the condition of high illuminance, the lens of the camera is usually stopped down and the OTF increases, and accordingly the Moiré is more likely to occur. Thus, the occurrence of the Moiré becomes the most dominant cause of the deterioration of the image quality when using the camera outdoors and in the sun under the fair sky (i.e., high illuminance, high color temperature).

In order to prevent the deterioration of the image quality due to the Moiré, it has been proposed to use an optical filter which utilizes a double refraction of a crystal to reduce a response in a specific input spatial frequency band. However, this means does not sufficiently suppress the Moiré and lowers a resolution near the spatial frequency band. Further, it needs an expensive crystal filter.

The technology relating to the color video camera signal processing circuit is described in an article "PAL System Solid-State Color Camera with Single Chip MOS Imager", by M. Masuda et al., IEEE International Conference on Consumer Electronics, Digest of Technical Papers pages 154–155 (held on June 9, 1983).

It is, therefore, an object of the present invention to provide a color video camera signal processing circuit having a high color reproducibility, a high S/N ratio and an excellent Moiré characteristic.

In accordance with one aspect of the present invention, a color video camera signal processing circuit which concurrently meets the high color reproducibility and the high S/N ratio, or, the high color reproducibility and the excellent Moiré characteristic, is provided with an intensity signal generating circuit for generating an intensity signal on the basis of color signals from an imager, and a color difference signal generating circuit for generating a color difference signal on the basis of the color signals independently from the intensity signal, to thereby generate a color video signal on the basis of the color difference signal and the intensity signal.

In accordance with another aspect of the present invention, a color video camera signal processing circuit which concurrently meets the high color reproducibility and the high S/N ratio or the high color reproducibility and the excellent Moiré characteristic is provided with an intensity signal generating circuit which generates an intensity signal on the basis of color signals from an imager, and a color difference signal generating circuit for generating a color difference signal which circuit includes a circuit for generating a signal R (red), a circuit for generating a signal B (blue) and a circuit for generating a signal G (green), on the basis of signals R, B and G independently from the intensity signal, to thereby generate a color video signal on the basis of the color difference signal and the intensity signal.

In accordance with another aspect of the present invention, when an intensity signal is generated by adding output signals from an imager, means is provided to set proportions of the output signals such that products of ratios of the output signals to be added and ratios of sensitivities of photo-sensors of the imager are equal so that an influence by a difference among the ratios of the sensitivities of the photo-sensors of the imager is eliminated.

In accordance with a further aspect of the present invention, sufficiently high S/N ratio and Moiré characteristic are attained under any photographing condition of either high illumination or low illumination by adjusting ratios of output signals of an imager to be added in accordance with a stop value of a lens by a control signal from a lens stop controller of the imager when the output signals of the imager are added to produce an intensity signal.

The above and other objects, features and advantages of the present invention will be apparent from the following detailed description of the preferred embodiments of the invention in conjunction with the accompanying drawings, in which.

Figures 1, 2:
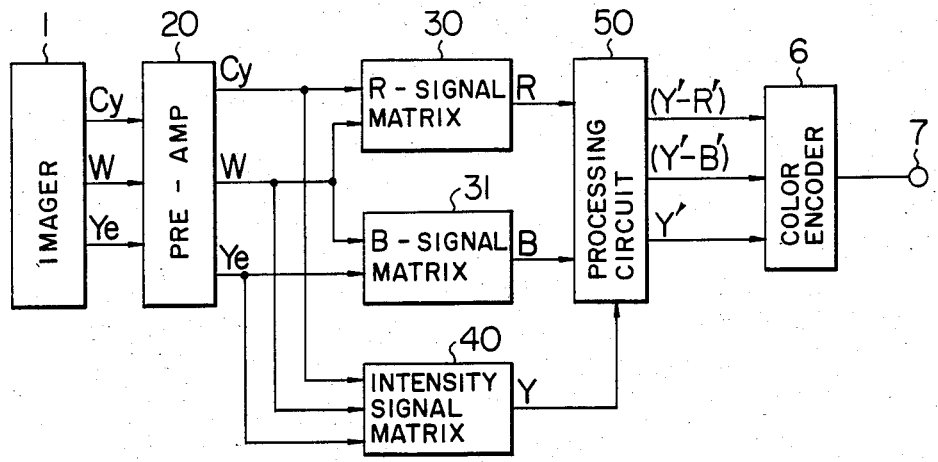
FIG. 1 is a diagram showing an arrangement of photo-sensors of a solid-state imager.
FIG. 2 is a block diagram of a prior art color video camera signal processing circuit.
Figure 3:
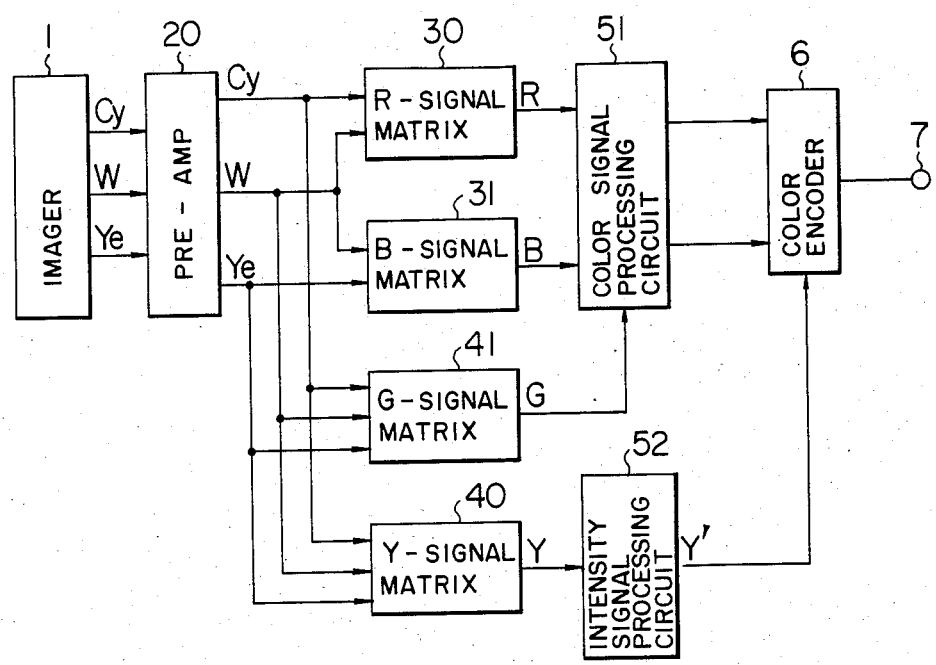
FIG. 3 is a block diagram of one embodiment of the present invention.

Referring now to FIG. 3, one embodiment of the present invention is explained. The like elements to those shown in FIG. 2 are designated by the like numerals and explanation thereof is omitted. In FIG. 3, numeral 1 denotes an imager which generates signals W (transparent), Ye (yellow) and Cy (cyan). Numeral 20 denotes a pre-amplifier. Numeral 30 denotes an R (red) signal matrix circuit, numeral 31 denotes a B (blue) signal matrix circuit, numeral 41 denotes a G (green) signal matrix circuit and numeral 40 denotes a Y (intensity) signal matrix circuit. Numeral 51 denotes a color signal processing circuit, numeral 52 denotes an intensity signal processing circuit, numeral 6 denotes a color encoder and numeral 7 denotes an output terminal. The R, G and B-signal matrix circuits 30, 31 and 41 and the color signal processing circuit 51 form a color difference signal generating circuit.

The operation is explained below. In the embodiment of FIG. 3, the output signals W, Ye and Cy from the imager are amplified by the pre-amplifier 20 and a signal R is generated by the R-signal matrix circuit 30, a signal B is generated by the B-signal matrix circuit 31, a signal G is generated by the G-signal matrix circuit 41 and a signal Y is generated by the Y-signal matrix circuit 40. The signals R, B and G are processed by the color signal processing circuit 51, which generates color difference signals $(R'-Yc')$ and $(B'-Yc')$, where Yc represents the signal Y for the color difference signal and the prime represents the processed signal. On the other hand, the signal Y is processed by the intensity signal processing circuit 52, which generates a signal Y' An NTSC standard signal is generated by the color encoder 6 from the signals Y', $(R'-Yc')$ and $(B'-Yc')$ as a camera signal output.

In the present embodiment, the signals R, B and G instead of the signals R, B and Y are processed to generate the color difference signal, and the signal Y is also separately processed and the NTSC standard signal is generated based on the processed signal Y' and the color difference signals.

The signals Y, R and B are generated in o accordance with the formulas (4), (4'), (5) and (6), and the signal G is generated in accordance with the following formula $$G = g_1 Ye + g_2 Cy - g_3 W \qquad (7)$$

where $g_1$, $g_2$ and $g_3$ are positive numbers representing component ratios.

Since the signal Y is independent from the signals R, B and G for generating the color difference signals, the color reproducibility (color phase reproducibility) is not deteriorated when the component ratios of the Y signals are set to enhance the S/N ratio or the Moiré characteristic. Thus, the discrepancy between the color reproducibility and the Moiré characteristic or the discrepancy between the color reproducibility and the S/N ratio, which was the first problem encountered in the prior art circuit, is resolved.

When the color reproducibility is to be enhanced, the signal G is generated in accordance with the following formula $$G = 0.3Ye + 0.4Cy - 0.3W \qquad (7')$$

When the Moiré characteristic is to be enhanced, the signal Y is, for example, generated in accordance with the following formula.

$$Y = 0.25W + 0.35Ye + 0.40Cy \qquad (4'')$$

Thus, the Moiré is reduced by a factor of several relative to that of the prior art circuit. If the S/N ratio is to be enhanced, the component ratios of the signal Y may be changed.

Since the γ-correction and white balance adjustment are effected by using the signals R, B and G instead of the signals R, B and Y for generating the color difference signals, the color error which was the second problem encountered in the prior art circuit is avoided. Detailed explanation on the color error phenomenon is presented in the above-mentioned article.

In the present embodiment, the means for generating the color difference signal based on the signals R, G and B and the means for generating the intensity signal independently from the means for generating the color difference signal are used. Alternatively, means for generating the color difference signal based on the intensity signal, instead of the signal G, and the signals R and B and means for generating an inherent intensity signal which is separate from the intensity signal used to generate the color difference signal may be used to generate the camera output signal. In this case, the intensity signal which assures a high S/N ratio or an excellent Moiré characteristic with some degree of color reproducibility can be produced.

Figure 4:
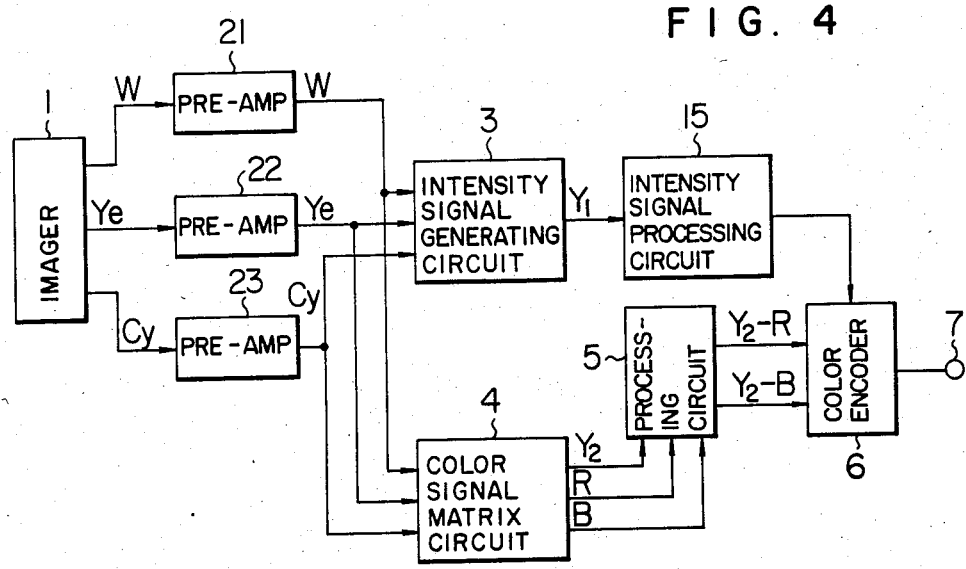
FIG. 4 is a block diagram of another embodiment of the color video camera signal processing circuit of the present invention.
Figure 5:
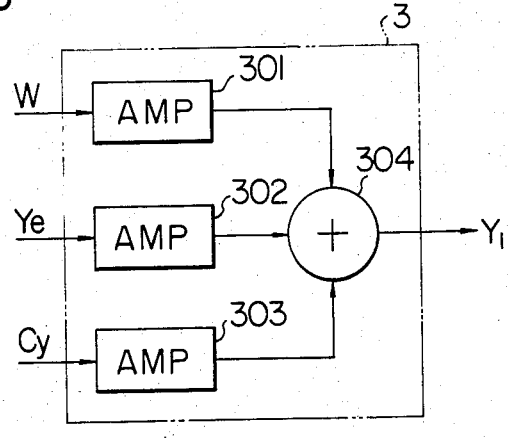
FIG. 5 is a block diagram of an intensity signal generating circuit of FIG. 4.
Figure 6:
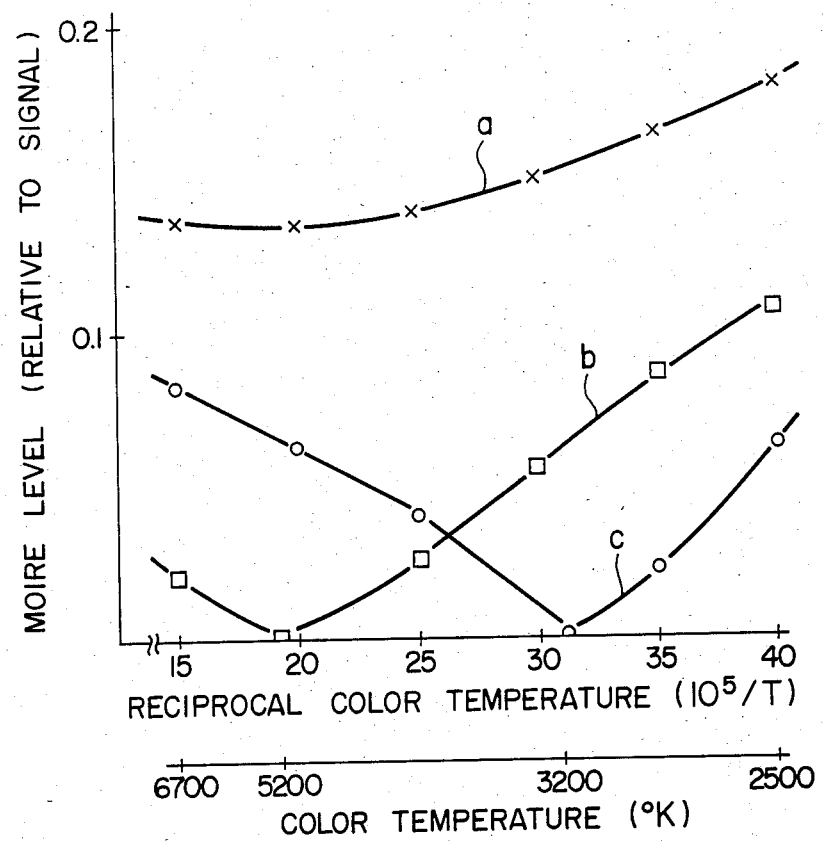
FIG. 6 illustrates an operation of the present invention.

Referring to FIGS. 4, 5 and 6, another embodiment of the present invention which allows a minimum Moiré level at any color temperature is explained. The like elements to those shown in FIGS. 2 and 3 are designated by the like numerals and explanation thereof is omitted.

FIG. 4 is a block diagram of an embodiment of the color video camera signal processing circuit of the present invention, in which numeral 1 denotes an imager, numerals 21, 22 and 23 denote pre-amplifiers, numeral 3 denotes an intensity signal generating circuit, numeral 4 denotes a color signal matrix circuit, numeral 5 denotes a processing circuit, numeral 6 denotes a color encoder, numeral 7 denotes an output terminal and numeral 15 denotes an intensity signal processing circuit.

The imager 1 has the color decomposing optical filter described above and a photo-sensing plane having photo-sensors arranged as shown in FIG. 1. It outputs signals W, Ye and Cy on respective signal lines. Those signals are amplified by the pre-amplifiers 21, 22 and 23 and the amplified signals are supplied to the intensity signal generating circuit 3 and the color signal matrix circuit 4.

The intensity signal generating circuit 3 sums the signals W, Ye and Cy at component ratios to be described below to generate an intensity signal (signal $Y_1$) On the other hand, the color signal matrix circuit 4 processes the signals W, Ye and Cy to generate an intensity signal (signal $Y_2$) and signals R and B from which color difference signals are generated. The signal $Y_2$ is generated independently from the signal $Y_1$. The generated signals $Y_1$ and $Y_2$, R and B are processed in the intensity processing circuit 15 and the processing circuit 5, respectively, for a γ-correction, and a processed signal of $Y_1$ and two color difference signals ($Y_2-R$) and ($Y_2-B$) are generated. Those signals are supplied to the color encoder 6 which generates an NTSC color video signal, which is supplied to the output terminal 7 as a camera output signal.

FIG. 5 is a block diagram of the intensity signal generating circuit 3 of FIG. 4. Numerals 301, 302 and 303 denote amplifiers and numeral 304 denotes a summing circuit.

The signal W from the pre-amplifier 21 (FIG. 4) is amplified by the amplifier 301, the signal Ye from the pre-amplifier 22 is amplified by the amplifier 302, and the signal Cy from the pre-amplifier 23 is amplified by the amplifier 303, and those amplified signals are summed in the summing circuit 3 to generate the signal $Y_1$.

The Moiré level M determined by differences among ratios of sensitivities of the photo-sensors of the imager 1 is quantatively represented by $$M = \frac{(\alpha^2 + \beta^2 + \gamma^2 - \alpha\beta - \beta\gamma - \gamma\alpha)^{\frac{1}{2}}}{\alpha + \beta + \gamma} \qquad (8)$$

where α, β and γ are products of summing ratios of the signals W, Ye and Cy to be summed in the summing circuit 304 and the ratios of the sensitivities of the photosensors.

From the formula (8), the Moiré can be substantially completely suppressed by setting $\alpha = \beta = \gamma$, that is, the products of the summing ratios of the signals W, Ye and Cy and the ratios of the sensitivities of the photo-sensors are substantially equal, or in other words the summing ratios of those signals are substantially equal to reciprocals of the ratios of the sensitivities.

Thus, the intensity signal generating circuit provides a proportion setting circuit wherein the amplification factors (gains) of the amplifiers 301, 302 and 303 are set such that the products of the summing ratios of the signals W, Ye and Cy and the ratios of the sensitivities of the photo-sensors are substantially equal.

Since the ratios of the sensitivities of the photo-sensors W, Ye and Cy of the imager vary with the color temperature, the Moiré level also varies with the color temperature.

FIG. 6 shows a graph of the color temperature versus the Moir',acu/e/ level, in which an abscissa represent a reciprocal of the color temperature and an ordinate represents the Moiré level.

When the output signals from the imager are summed at a unity ratio to generate the signal Y, the Moiré level is very high as shown by a curve a. When the products of the summing ratios of the signals W, Ye and Cy and the ratios of the sensitivities of the photo-sensors are adjusted to be substantially equal by the amplifiers 301, 302 and 303 of FIG. 5, the Moiré level to the color temperature is represented by a curve b for a color temperature of 5200° K., and by a curve c for a color temperature of 3200° K.

Since the ratios of the sensitivities of the photo-sensors W, Ye and Cy vary with the color temperature, the Moiré can be substantially perfectly suppressed only at a temperature at which the products of the summing ratios of the signals W, Ye and Cy and the ratios of the sensitivities of the photo-sensors are substantially equal. However, as seen from the curves b and c, the Moiré level is less than one half of that of the prior art (curve a) in the color temperature range of 3200° K.–5200° K. Since the Moiré remarkably appear in an outdoor photographing circumstance having a high color temperature and a high intensity, the image quality is significantly deteriorated. Accordingly, it is effective to set the amplification factors of the amplifiers 301, 302 and 303 such that the Moiré is minimum at the color temperature of 5200° K.

Figure 7:
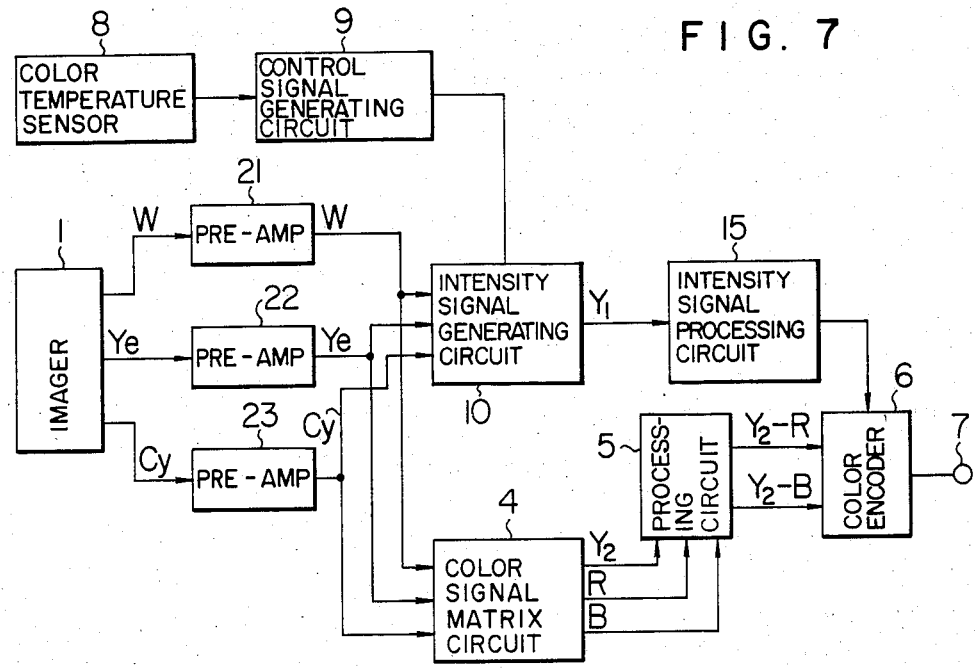
FIG. 7 is a block diagram of other embodiment of the color video camera signal processing circuit of the present invention.
Figure 8:
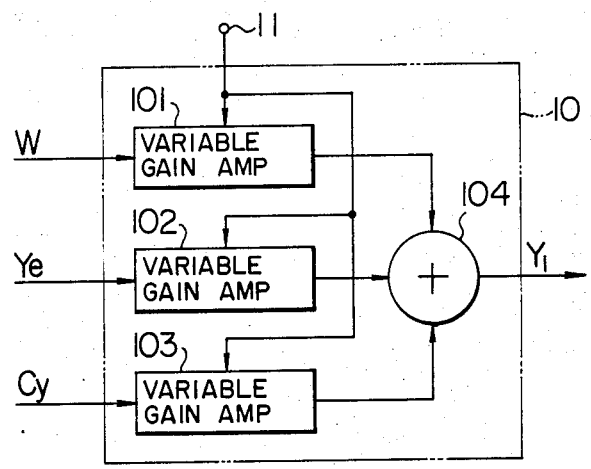
FIG. 8 is a block diagram of an intensity signal generating circuit of FIG. 7.
Figures 9, 10:
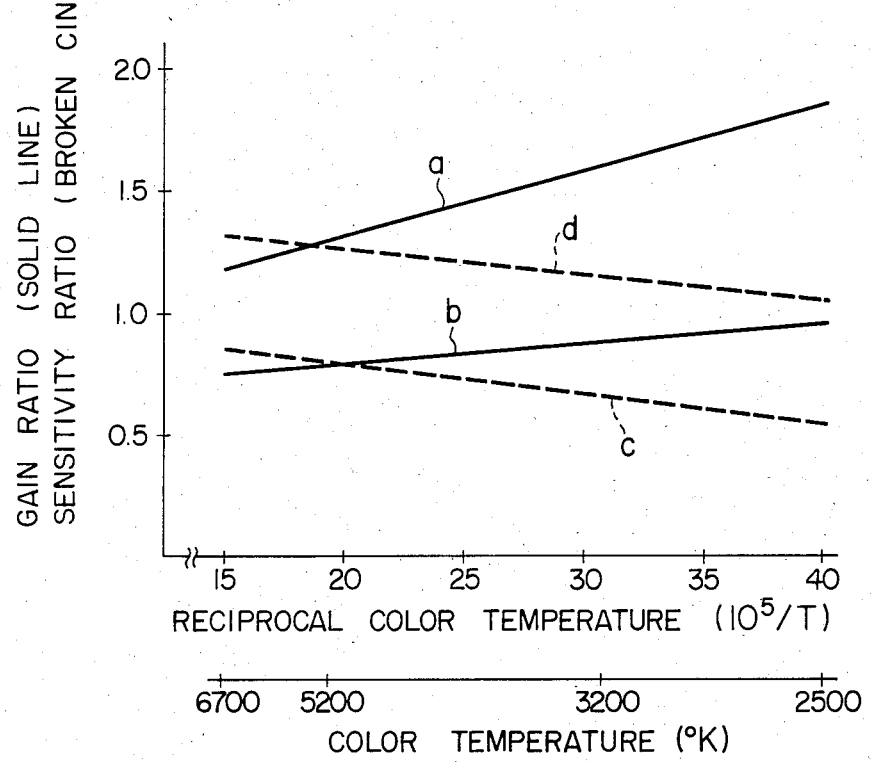
FIG. 9 illustrates an operation of the present invention.
FIG. 10 is a diagram of another embodiment of a photo-sensing plane of a solid-state imager having a color decomposing optical filter.

Referring to FIGS. 7 to 9, another embodiment of the present invention is explained.

FIG. 7 shows a block diagram of another embodiment of the color video camera signal processing circuit of the present invention. Numeral 8 denotes a color temperature sensor, numeral 9 denotes a control signal generating circuit and numeral 10 denotes an intensity signal generating circuit. The like elements to those shown in FIG. 4 are designated by the like numerals and explanation thereof is omitted.

In the present embodiment, the signals W, Ye and Cy from the amplifiers 21, 22 and 23 are summed in the intensity signal generating circuit 10 with variable summing ratios with the color temperature to generate the signal $Y_1$. The color temperature sensor 8 senses the color temperature and the control signal generating circuit 9 generates a control signal which represents the sensed color temperature. The control signal is supplied to the intensity signal generating circuit 10 so that the summing ratios are changed in accordance with the color temperature.

FIG. 8 is a block diagram of the intensity signal generating circuit 10 of FIG. 7. Numerals 101, 102 and 103 denote variable gain amplifiers, numeral 104 denotes a summing circuit and numeral 11 denotes a control signal input terminal.

In FIG. 8, signals W, Ye and Cy are supplied to the variable gain amplifiers 101, 102 and 103, respectively. Amplification factors (gains) of the variable gain amplifiers 101, 102 and 103 are controlled by a control signal supplied from the control signal generating circuit 9 through the input terminal 11. The signals W, Ye and Cy amplified by the variable gain amplifiers 101, 102 and 103 are summed in the summing circuit 104, which generates a signal $Y_1$.

The gains of the variable gain amplifiers 101, 102 and 103 vary with a color temperature sensed by the color temperature sensor 8 and are controlled such that products of the summing ratios of the signals W, Ye and Cy and the ratios of the sensitivities of the photo-sensors are substantially equal.

FIG. 9 is a graph showing a relationship between the gains of the variable gain amplifiers of FIG. 8 and the ratios of the sensitivities of the photo-sensors, and the color temperature. In the graph, the ratio of the sensitivity of the photo-sensor to the signal Ye and the gain of the variable gain amplifier 102 are set to 1.0, respectively.

In FIG. 9, a line a represents the amplification factor of the variable gain amplifier 101, a line b represents the amplification factor of the variable gain amplifier 103, a line c represents the ratio of sensitivity of the photo-sensor W and a line d represents the ratio of sensitivity of the photo-sensor Cy. The amplification factors are varied in accordance with the color temperature such that the product of the line a and the line c and the product of the line b and the line d are 1.0, respectively, for any color temperature.

The present embodiment can be considered to modify the embodiment of FIG. 6 to shift the curve b or c so that a minimum point of the line (that is, a minimum Moiré point) always corresponds to the color temperature. Thus, the Moiré level does not increase even if the color temperature changes and the Moiré is always suppressed effectively.

In the present embodiment, it is not always necessary to automatically detect the color temperature but manual white balancing means may be used to adjust the signals continuously or stepwise such that the products of the ratios of the sensitivities and the summing ratios are substantially equal.

Instead of controlling both the signals W and Cy, only the signal W which has a larger influence may be controlled.

In the above embodiments, the imager has the photo-sensors arranged on the photo-sensing plane in the order of W, Ye and Cy for each line as shown in FIG. 1. Alternatively, the imager may have photo-sensors W and G arranged in every other lines on the photo-sensing plane and the photo-sensors Cy and Ye arranged in every other lines, and the color decomposing optical filter having fine areas arranged to correspond to the arrangement of the photo-sensors may be provided in the photo-sensing plane. In such an imager, the photo-sensors $W_{11}$ and $Cy_{21}$ are read out, then the photo-sensors $G_{12}$ and $Ye_{22}$ are read out, then the photo-sensors $W_{13}$ and $Cy_{23}$ are read out and so on so that two photo-sensors in two lines are simultaneously read out. Thus, a readout frequency for reading out all pixels in a given time may be one half of that in the line-by-line readout system. Accordingly, this method is actually used frequently.

In such a two-line simultaneous readout system, four orthogonal pixels W, Cy, Ye and G form a unit for repetition and the signals read from the photo-sensors W, Cy, Ye and G are summed to generate the signal Y. Accordingly, a beat around a frequency fs/2, that is, the Moiré occurs due to differences among the ratios of the sensitivities of the combination of the photo-sensors W and Cy and the combination of the photo-sensors Ye and G, where fs is the sampling frequency for reading out the photo-sensors W, Cy, Ye and G.

Figure 11:
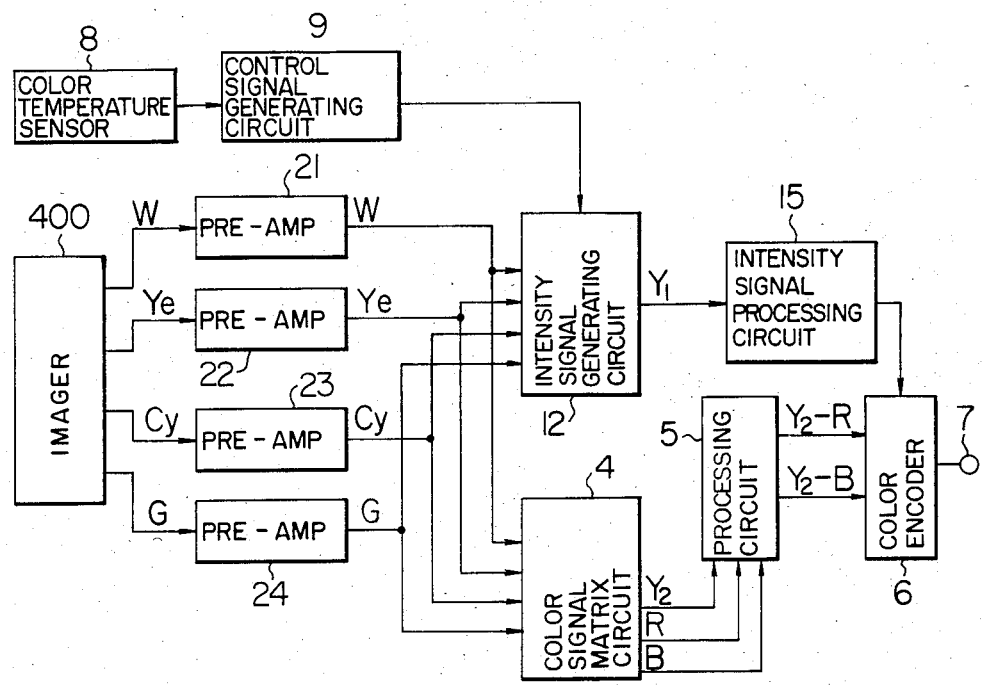
FIG. 11 is a block diagram of other embodiment of the color video camera signal processing circuit of the present invention.
Figure 12:
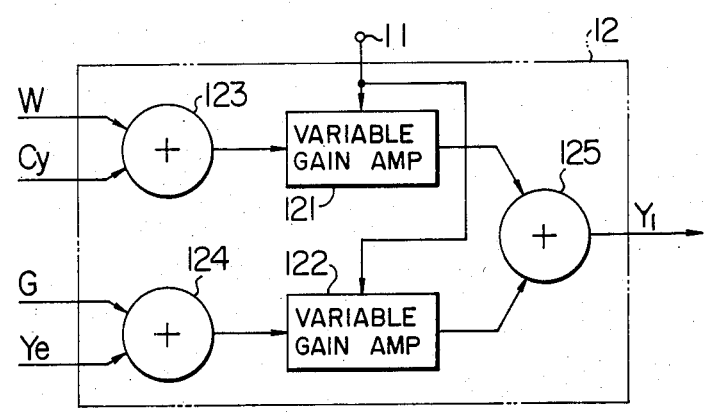
FIG. 12 is a block diagram of an intensity signal generating circuit of FIG. 11.

Referring to FIGS. 11 and 12, an embodiment of the present invention which uses the imager shown in FIG. 10 is explained.

FIG. 11 is a block diagram of another embodiment of the color video camera signal processing circuit of the present invention for suppressing the Moireé. Numeral 400 denotes an imager, numeral 24 denotes a preamplifier and numeral 12 denotes an intensity signal generating circuit. The like elements to those shown in FIG. 7 are designated by the like numeral and explanation thereof is omitted.

In FIG. 11, the imager 400 has the photo-sensing plane shown in FIG. 10 and produces signals W, Cy, G and Ye on separate signal lines. Those signals are amplified by the pre-amplifiers 21–24 and the amplified signals are supplied to the intensity signal generating circuit 12, which generates the signal $Y_1$. The signals are also supplied to the color signal matrix circuit 4, which generates signals $Y_2$, R and B.

FIG. 12 is a block diagram of the intensity signal generating circuit 12 of FIG. 11. Numerals 121 and 122 denote variable gain amplifiers and numerals 123, 124 and 125 denote summing circuits.

The signals W and Cy from the pre-amplifiers 21 and 23 are summed in the summing circuit 123 and an output signal (W+Cy) thereof is supplied to the variable gain amplifier 121. The signals G and Ye from the preamplifiers 24 and 22 are summed in the summing circuit 124 and an output signal (G+Ye) thereof is supplied to the variable gain amplifier 122.

The gains of the variable gain amplifiers 121 and 122 are controlled by a control signal supplied from the control signal generating circuit 9 through the input terminal 11 as is done in the embodiment shown in FIGS. 7 and 8. The signals (W+Cy) and (G+Ye) amplified by the variable gain amplifiers 121 and 122, respectively, are supplied to the summing circuit 125, which generates a signal $Y_1$. The gains of the variable gain amplifiers 121 and 122 are controlled by the control signal in accordance with the color temperature sensed by the color temperature sensor 8 such that the products of the ratios of the sensitivities of the photo-sensors to the signals (W+Cy) and (G+Ye) and the summing ratios are substantially equal. Accordingly, the Moir',acu/e/ around the frequency of fs/2 is suppressed in the generated signal $Y_1$.

In the present embodiment, the ratio of the sensitivity of the photo-sensor to the signal (W+Cy) is a sum of the ratio of the sensitivity of the photo-sensor W and the ratio of the sensitivity of the photo-sensor Cy. The ratio of the sensitivity of the photo-sensor to the signal (G+Ye) is similarly defined. The summing ratios of the signals W and Cy in the summing circuit 123 and the summing ratios of the signals G and Ye in the summing circuit 124 need not necessarily be unity. Instead of setting the summing ratios to the signals (W+Cy) and (G+Ye), the variable gain amplifiers one for each of the signals W, Cy, G and Ye and the summing circuit for summing the outputs of these amplifiers may be provided in a manner similar to the embodiment of FIGS. 7 and 8 so that the products of the ratios of the sensitivities of the photo-sensors to those signals and the summing ratios are rendered substantially equal. The variable gain amplifiers for each of the signals W, Cy, G and Ye is controlled by the control signal of the circuit 9 in accordance with color temperature sensed by the color temperature sensor 8. Alternatively, as shown in the embodiment of FIGS. 4 and 5, the products of the sensitivities of the photo-sensors to the signals (W+Cy) and (G+Ye), or the signals W, Cy, G and Ye and the summing ratios at a predetermined color temperature may be rendered substantially equal.

In the above embodiments, the color pixel combinations of the imager are (W, Ye, Cy) and (W, Cy, G, Ye). However, the present invention is applicable to combinations of various color pixels such as (Ye, Cy, G), (Cy, G, R) and (Ye, Cy, G, Mg), where Mg is magenta.

In the above embodiments, it was noted that the cause of the Moiré was the differences among the ratios of the sensitivities of the photo-sensors W, Ye and Cy and the following Y-signal generating formula was used instead of the formula (4)

$$Y = y_1 W + y_2 Ye + y_3 Cy \qquad (4')$$

where $y_1$, $y_2$ and $y_3$ are positive numbers representing the ratios of the sensitivities or the component ratios. The products of the ratios of the sensitivities of the photo-sensors to the signals W, Ye and Cy and the summing ratios are rendered substantially equal so that the beat at the sampling frequency of fs/3 is suppressed and the Moireé is suppressed.

However, the signals W, Ye and Cy include random noises such as thermal noises generated in the amplifiers in the preceding stage to the intensity signal generating circuit which generates the signal Y and thermal noises generated in the imager. Those noises usually have no correlation among the signals W, Ye and Cy and are equally distributed. On the other hand, the signal levels of the signals W, Ye and Cy generated by the imager are not equal even for a white subject but the signal W has a highest level and the signal Cy has a lowest level. Accordingly, of the signals W, Ye and Cy supplied to the intensity signal generating circuit, the signal W has a high S/N ratio and the signal Cy has a low S/N ratio.

When the signal Y is to be generated from those signals W, Ye and Cy in accordance with the formula (4') to minimize the Moiré, the summing ratios of the respective signals must be $y_1 < y_2 < y_3$ because of the ratios of the sensitivities of the photo-sensors W, Ye and Cy. As a result, the generated signal Y includes more signal Cy having the low S/N ratio and less signal W having the high S/N ratio, and the S/N ratio of the signal Y is lowered In this manner, the Moiré and the S/N ratio are always incompatible.

However, the Moiré poses a problem in a high illumination circumstance in which a subject has a high contrast and a stop value of a lens is small, and the Moiré will hardly occur in a low illumination circumstance.

On the other hand, the S/N ratio poses a problem when the illumination is too low for the imager to produce a sufficient level of signals and hence the signals are highly amplified by high gain amplifiers, and it poses little problem in the high illumination circumstance.

From the above and based on normal conditions under which the color video camera is used, when the illumination is high or the gains of the amplifiers for amplifying the output signals of the imager are low, the summing ratios of the input signals to the intensity signal generating circuit which generates the signal Y are set to minimize the Moiré, and when the illumination is low or the gains of the amplifiers are high, the summing ratios of the input signals are set to release the minimum Moiré condition or to meet a high S/N ratio condition so that the Moiré in the signal Y is suppressed and the reduction of the S/N ratio is prevented.

Figure 13:
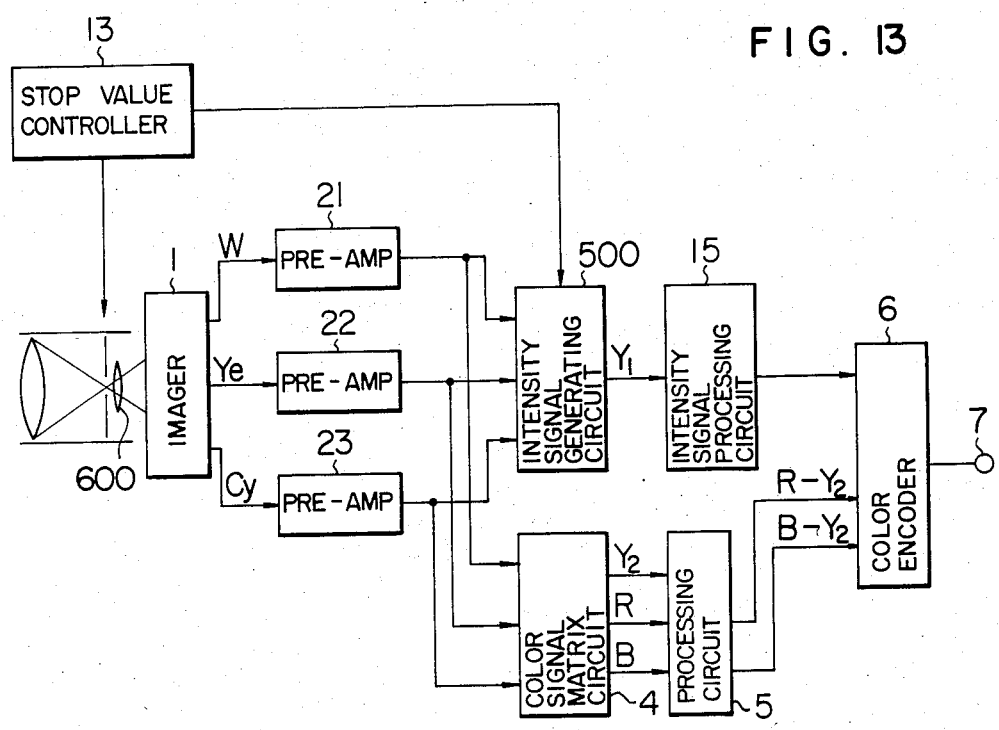
FIGS. 13 and 14 are block diagrams of other embodiments of the color video camera signal processing circuit of the present invention.

FIG. 13 is a block diagram of an embodiment of the color video camera signal processing circuit of the present invention based on the above concept. Numeral 500 denotes an intensity signal generating circuit and numeral 13 denotes a stop value controller of a video camera lens 600. The like elements to those shown in FIG. 4 are designated by the like numerals and explanation thereof is omitted.

In the present embodiment, the imager 1 has the photo-sensing plane shown in FIG. 1.

Signals W, Ye and Cy from the pre-amplifiers 21, 22 and 23 are supplied to the intensity signal generating circuit 500 which generates a signal $Y_1$ in accordance with the formula (4'). The summing ratios $y_1$, $y_2$ and $y_3$ of the signals W, Ye and Cy are changed between the high illumination and the low illumination by a control signal which represents a stop value of a lens (i.e. illumination level), supplied from the stop value controller 13. The summing ratios may be set as follows.

High illumination $y_1 = \frac{1}{1.15}$, $y_2 = 1.0$, $y_3 = \frac{1}{0.65}$

Low illumination $y_1 = 1.0$, $y_2 = 1.0$, $y_3 = 1.0$

The above summing ratios at the high illumination were determined based on a condition to minimize the Moiré which is generated when a non-colored (monochromatic) subject is imaged by a halogen lamp having a color temperature of 3200° K. By modifying the summing ratios at the low illumination, the S/N ratio was improved by approximately 1 dB. The summing ratios may be adjusted either continuously or stepwise.

Figure 14:
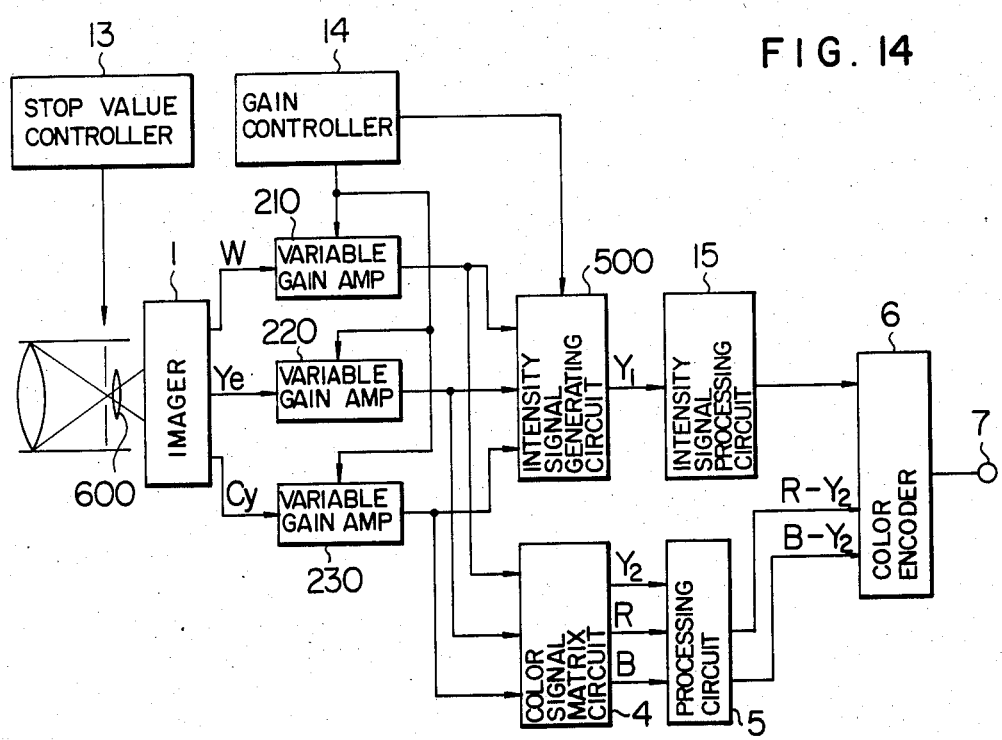

FIG. 14 is a block diagram of a further embodiment of the color video camera signal processing circuit which suppresses the Moiré and prevents the reduction of the S/N ratio. Numerals 210, 220 and 230 denote variable gain amplifiers and numeral 14 denotes a gain controller. The like elements to those shown in FIG. 13 are designated by the like numerals and explanation thereof is omitted.

In the present embodiment, the variable gain amplifiers 210, 220 and 230 are provided to amplify the signals W, Ye and Cy from the imager 1 and the gains thereof are controlled by the gain controller 14. The summing ratios of the signal W, Ye and Cy in the intensity signal generating circuit 500 are also controlled by the gain controller 14.

At the high illumination, the gain controller 14 lowers the gains of the variable gain amplifiers 210, 220 and 230 to prevent the distortion of the signal $Y_1$ at a white peak and sets the summing ratios of the signals W, Ye and Cy in the intensity signal generating circuit 500 to the values shown in the embodiment of FIG. 13 in order to minimize the Moiré. At the low illumination, the gain controller 14 raises the gains of the variable gain amplifiers 210, 220 and 230 to produce the high amplitude signal $Y_1$ and releases the summing ratios of the signals W, Ye and Cy in the intensity signal generating circuit 500 from the minimum Moiré condition and sets them to the values shown in the embodiment of FIG. 13.

In the present embodiment, the Moiré is suppressed and the S/N ratio is improved as are done in the embodiment of FIG. 13, and the distortion of the white peak of the signal $Y_1$ at the high illumination is prevented, and the image quality is significantly improved.

In the present embodiment, the gains of the variable gain amplifiers and the summing ratios of the input signals in the intensity signal generating circuit may be continuously changed, or both or one of them may be changed stepwise, or the gains may be manually controlled or AGC circuits may be used. The variable gain amplifiers may be arranged in a succeeding stage to the intensity signal generating circuit instead of in the preceding stage.

In the embodiments of FIGS. 13 and 14, the signal for controlling the component proportions or summing ratios for the Y signal is not limited to the signal derived from the stop value controller for the lens, but, instead, other signals such as a control signal may be used which control signal is a signal used in the variable gain amplifier provided frequently in the video cameras which amplifier is used to output substantially a constant image signal output.

In the embodiments of FIGS. 13 and 14, the imager has the photo-sensing plane shown in FIG. 1. The present invention can be applied to an imager having three-color pixel combination such as (Ye, Cy, G), (R, G, Cy) or (R, G, B) or an imager having a four-color pixel combination such as (W, Ye, Cy, G) or (Mg, Ye, Cy, G), as shown in the embodiment of FIGS. 7 and 8, the summing ratios of the input signals to the intensity signal generating circuit may be changed in accordance with the color temperature at the high illumination.

In the mean time, in the embodiments of FIGS. 4, 7, 11, 13 and 14 explained heretofore, the R, B and $Y_2$ (intensity) signals are utilized to generate the color difference signals, it is obvious that the R, B and G (green) signals may be used instead as in the case of the embodiment of FIG. 3 with more improved images being obtained.

As described hereinabove, in accordance with the present invention, the color reproducibility can be optimized without affecting to the S/N ratio of the video camera. Further, the Moiré can be reduced by a factor of several relative to the prior art circuit without affecting the color reproducibility.

Further, the color error due to the γ-correction and the white balance is eliminated.

The Moiré which has been unavoidable in the imager having the color decomposing optical filter can be sufficiently suppressed irrespective of the color temperature and without lowering the resolution so that the image quality is significantly improved. An expensive optical filter may be omitted in suppressing the Moiré. Thus, a color video camera signal processing circuit which eliminates the disadvantages of the prior art circuit and has an excellent performance is provided.

We claim:

1. A video camera signal processing circuit adapted to be connected to imaging means including photo-electric conversion means having a plurality of photo-sensors: arranged for generating a plurality of color signals in response to a plurality of color rays, comprising:
   first intensity signal generating circuit means for generating a first intensity signal containing each of said color signals at predetermined proportions; said first intensity signal generating circuit means including proportion setting circuit means for setting said predetermined proportions such that products of said predetermined proportions for said respective color signals and ratios of sensitivities of corresponding photo-sensors are substantially equal; and
   circuit means for generating color difference signals on the basis of said color signals, said color difference signal generating circuit means including color signal matrix circuit means for generating signals R (red) and B (blue) and a secondary intensity signal based on said color signals and processing circuit means for generating said color difference signals on the basis of said signals R and B and said second intensity signal.

2. A color video camera signal processing circuit according to claim 1, wherein said proportion setting circuit means includes circuit means for controlling said color signals such that said products are substantially equal at a selected color temperature, and circuit means for summing the controlled color signals.

3. A color video camera signal processing circuit according to claim 1, wherein said photo-sensors are provided for complementary color signals W (transparent), Ye (yellow) and Cy (cyan).

4. A color video camera signal processing circuit according to claim 1, wherein said photo-sensors are provided for signals W (transparent), G (green), Cy (cyan) and Ye (yellow), said proportion setting circuit means includes first summing circuit means for summing said signals W and Cy, second summing circuit means for summing said signals G and Ye, first variable gain amplifier means for amplifying an output signal of said first summing circuit means, second variable gain amplifier means for amplifying an output signal of said second summing circuit means, third summing circuit means for summing output signals from said first and second variable gain amplifier means, and a color temperature sensor for producing a signal to control gains of said first and second variable gain amplifier means, whereby said first intensity signal containing signals (W+Cy) and (G+Ye) at such a proportion that products of ratios of sensitivities of said photo-sensors to the signals (W+Cy) and (G+Ye) and proportions of the signals (W+Cy) and (G+Ye) are substantially equal, is generated, the ratio of sensitivity of the photo-sensors to the signal (W+Cy) being defined by a sum of the ratios of sensitivities of the photo-sensors W and Cy, and the ratio of sensitivity of the photo-sensors to the signal (G+Ye) being defined by a sum of the ratios of the sensitivities of the photo-sensors G and Ye.

5. A color video camera signal processing circuit according to claim 1, wherein said photo-sensors are provided for color signals W (transparent), G (green), Cy (cyan) and Ye (yellow), said proportion setting circuit means includes first variable gain amplifier means for amplifying said W signal, second variable gain amplifier means for amplifying said G signal, and third variable gain amplifier means for amplifying said Cy signal, fourth variable gain amplifier means for amplifying said Ye signal, summing circuit means for summing each of the output signals of said first, second, third and fourth variable gain amplifier means, and a color temperature sensor for producing a signal to control gains of said first, second, third and fourth variable gain amplifier means, whereby the gains of said first, second, third and fourth variable gain amplifier means are controlled so that products of ratios of sensitivities of said photo-sensors to the signals W, G, Cy and Ye and proportions of said signals W, G, Cy and Ye are substantially equal from one another.

6. A color video camera signal processing circuit according to claim 1, wherein said first intensity signal generating circuit means is controlled by a control signal from a stop value controller of a lens of said imaging means so that said predetermined proportions are adjusted in accordance with a stop value of said lens.

7. A color video camera signal processing circuit according to claim 1, wherein said proportion setting circuit means includes variable gain amplifier means for amplifying said color signals at variable gains in accordance with a color temperature such that said products are substantially equal over a predetermined color temperature range, and means for summing the amplified color signals.

8. A color video camera signal processing circuit according to claim 7, whereinsaid proportion setting circuit means includes a color temperature sensor, the gain of said variable gain amplifier means being controlled by an output signal from said color temperature sensor.

9. A color video camera signal processing circuit according to claim 1, wherein said first intensity signal generating circuit is controlled by a control signal of first variable gain amplifier circuit provided for controlling the image signal outputted from said color video camera to a substantially constant value to adjust said predetermined proportions.

10. A color video camera signal processing circuit according to claim 9 further comprising second variable gain amplifier means connected to an input of said first intensity signal generating means for amplifying said color signals from said imaging means and supplying the amplified color signal to the input of said first intensity signal generating circuit means, said first intensity signal generating means and said variable gain amplifier means being controlled by said control signal from said first variable gain amplifier circuit.

11. A video camera signal processing circuit adapted to be connected to imaging means including photo-electric conversion means having a plurality of photo-sensors arranged for generating a plurality of color signals in response to a plurality of color rays, comprising:

first intensity signal generating circuit means for generating a first intensity signal containing each of said color signals at predetermined proportions; said first intensity signal generating circuit means including proportion setting circuit means for setting said predetermined proportions such that products of said predetermined proportions for said respective color signals and ratios of sensitivities of corresponding photo-sensors are substantially equal; and circuit means for generating color difference signals on the basis of said color signals, said color difference signal generating circuit means including color signal matrix circuit means for generating signals R (red) and B (blue) and a first G (green) signal based on said color signals and processing circuit means for generating said color difference signals on the basis of said signals R and B and said first G signal.

12. A color video camera signal processing circuit according to claim 11, wherein said proportion setting circuit means includes circuit means for controlling said color signals such that said products are substantially equal at a selected color temperature, and circuit means for summing the controlled color signals.

13. A color video camera signal processing circuit according to claim 11, wherein said photo-sensors are provided for complementary color signals W (transparent), Ye (yellow) and Cy (cyan).

14. A color video camera signal processing circuit according to claim 11, wherein said photo-sensors are provided for signals W (transparent), second G (green), Cy (cyan) and Ye (yellow), said proportion setting circuit means includes first summing circuit means for summing said signals W and Cy, second summing circuit means for summing said signals second G and Ye, first variable gain amplifier means for amplifying an output signal of said first summing circuit means, second variable gain amplifier means for amplifying an output signal of said second summing circuit means, third summing circuit means for summing output signals from said first and second variable gain amplifier means, and a color temperature sensor for producing a signal to control gains of said first and second variable gain amplifier means, whereby said first intensity signal containing signals (W+Cy) and (second G+Ye) at such a proportion that products of ratios of sensitivities of said photo-sensors to the signals (W+Cy) and (second G+Ye) and proportions of the signals (W+Cy) and (second G+Ye) are substantially equal, is generated, the ratio of sensitivity of the photo-sensors to the signal (W+Cy) being defined by a sum of the ratios of sensitivities of the photo-sensors W and Cy, and the ratio of sensitivity of the photo-sensors to the signal (second G+Ye) being defined by a sum of the ratios of the sensitivities of the photo-sensors G and Ye.

15. A color video camera signal processing circuit according to claim 11, wherein said photo-sensors are provided for color signals W (transparent), second G (green), Cy (cyan) and Ye (yellow), said proportion setting circuit means includes first variable gain amplifier means for amplifying said W signal, second variable gain amplifier means for amplifying said second G signal, and third variable gain amplifier means for amplifying said Cy signal, fourth variable gain amplifier means for amplifying said Ye signal, summing circuit means for summing each of the output signals of said first, second, third and fourth variable gain amplifier means, and a color temperature sensor for producing a signal to control gains of said first, second, third and fourth variable gain amplifier means, whereby the gains of said first, second, third and fourth variable gain amplifier means are controlled so that products of ratios of sensitivities of said photosensors to the signals W, second G, Cy and Ye and proportions of said signals W, second G, Cy and Ye are substantially equal from one another.

16. A color video camera signal processing circuit according to claim 11, wherein said proportion setting circuit means includes variable gain amplifier means for amplifying said color signals at variable gains in accordance with a color temperature such that said products are substantially equal over a predetermined color temperature range, and mean for summing the amplified color signals.

17. A color video camera signal processing circuit according to claim 16, wherein said proportion setting circuit means includes a color temperature sensors, the gain of said variable gain amplifier means being controlled by an output signal from said color temperature sensor.

18. A video camera signal processing circuit adapted to be connected to imaging means including photo-electric conversion means having a plurality of photo-sensors arranged for generating a plurality of color signals in response to a plurality of color rays, comprising:
first intensity signal generating circuit means for generating a first intensity signal containing each of said color signals at predetermined proportions;
variable gain amplifier means connected to an input of said first intensity signal generating means for amplifying said color signals from said imaging means and supplying the amplified color signal to the input of said first intensity signal generating circuit means;
control means connected to said first intensity signal generating means and said variable gain amplifier means for controlling said first intensity signal generating means and said variable gain amplifier means; and
circuit means for generating color difference signals on the basis of said color signals.

19. A color video camera signal processing circuit according to claim 18, wherein said control means includes an AGC circuit.

20. A color video camera signal processing circuit according to claim 18, wherein said control means includes means for manually controlling the gains of said variable gain amplifier means.

21. A video camera signal processing circuit adapted to be connected to imaging means including photo-electric conversion means having a plurality of photo-sensors arranged for generating a plurality of color signals in response to a plurality of color rays, comprising:
first intensity signal generating circuit means for generating a first intensity signal containing each of said color signals at predetermined proportions; and
circuit means for generating color difference signals on the basis of said color signals;
said color signals being complementary color signals W (transparent), Ye (yellow) and Cy (cyan), said color difference signal generating means include R-signal generating circuit means, B-signal generating means and G-signal generating circuit means for generating signals R (red), B (blue) and G (green) on the basis of said complementary color signals, said color difference signal being generating based on said signals R, B and G;
said first intensity signal Y and said signal R, G and B being generated in accordance with the following formulas:

$$Y = y_1 W + y_2 Ye + y_3 Cy$$

$$R = r_1 W - r_2 Cy$$

$$B = b_1 W - b_2 Ye$$

$$G = g_1 Ye + g_2 Cy - g_3 W$$

where $y_1$, $y_2$ and $y_3$, are positive numbers representing color component ratios of the signals Y, $r_1$ and $r_2$ are positive numbers representing color components ratios of the signal R, $b_1$ and $b_2$ are positive numbers representing color component ratios of the signal B and $g_1$, $g_2$ and $g_3$ are positive numbers representing color component ratios of the signal G.

* * * * *